United States Patent

[11] 3,534,771

| [72] | Inventors | Homer F. Eyerdam;<br>Henry W. Krohn, Cleveland, Ohio |
|---|---|---|
| [21] | Appl. No. | 678,862 |
| [22] | Filed | Oct. 30, 1967 |
| [45] | Patented | Oct. 20, 1970 |
| [73] | Assignee | Eaton Yale & Towne Inc.<br>Cleveland, Ohio<br>a corporation of Ohio |

[54] VALVE ASSEMBLY
17 Claims, 20 Drawing Figs.

[52] U.S. Cl. ................................................. 137/516.25,
137/525, 222/402.16, 222/494, 222/495, 222/518,
239/337, 239/573, 251/342
[51] Int. Cl. ................................................. B65d 83/14
[50] Field of Search ........................................ 222/402.16,
494, 495, 496, 518; 141/20; 137/525, 516.25;
251/342(Rubber Spr. Dig); 239/337, 573, 579;
215/56(Cursory), 11.2(Cursory) 220/44(Cursory)

[56] References Cited
UNITED STATES PATENTS

| 597,954 | 1/1898 | Cartwright | 137/525X |
| 1,992,067 | 2/1935 | Gunn | 222/518X |
| 2,106,638 | 1/1938 | Hillier | 137/525X |
| 2,121,354 | 6/1938 | Johnson | 251/342X |
| 2,543,850 | 3/1951 | Henricson | 222/518 |
| 3,087,656 | 4/1963 | Dougherty | 222/518 |
| 3,180,374 | 4/1965 | Muller | 141/20 |
| 3,241,727 | 3/1966 | Heckman | 222/518X |
| 3,283,963 | 11/1966 | Boyer et al. | 222/402.24 |
| 3,415,426 | 12/1968 | Kleveland | 222/518 |

*Primary Examiner*—William F. O'Dea
*Assistant Examiner*—David J. Zobkiw
*Attorney*—Teagno and Toddy ABSTRACT: A flow control valve assembly for charging, or dispensing material from, pressurized containers characterized by a resilient valve body and a valve insert member. The resilient valve body defines a flow passageway therethrough having a valve seat therein and further functions to maintain the valve in a normally closed position and to resiliently maintain the valve insert member in a predetermined attitude with respect to the passageway through the valve body when the valve is in an open position.

The valve is further characterized by the internal flow passageway being unrestricted downstream of the valve seat when the valve is in the open position.

Fig 1

INVENTORS
HENRY W. KROHN &
HOMER F. EYERDAM

BY

ATTORNEY

INVENTORS
HENRY W. KROHN &
HOMER F. EYERDAM

ATTORNEY

VALVE ASSEMBLY

BACKGROUND OF INVENTION

1. Field of Invention

This invention relates generally to a normally closed flow control valve and more particularly to a resilient body flow control valve.

2. Discussion of the Prior Art

Filling and dispensing valves for use with aerosol and pressurized containers are known in the prior art, a representative sample of which are disclosed in the hereinafter discussed United States Patents.

U.S. Pat. No. 3,283,785 to Beres et al. issued Nov. 8, 1966 discloses a pressurized container of a type generally used for dispensing liquids and fluids of a well known type. The valves disclosed in the Beres et al. patent for filling and dispensing the contents of the pressurized container are illustrative of the problems solved by the invention of the present case. In the Beres et al. patent, the valves comprise a plurality of elements, each of which must be manufactured and assembled with a high degree of care and accuracy. In the case of valves for a small, household size pressurized container, the manufacturing and assembly machinery is, of necessity, highly sophisticated and expensive. Further, if the valves should by reason of leakage or otherwise require replacement after charging of the container, but before shipment from the place of container assembly, the scrapping of the entire pressurized container or a major portion thereof would be required.

In addition, a problem exists in the type of valve disclosed, in providing a sufficient flow passageway through the valve to accomodate the desired filling and dispensing rates while maintaining a reasonable overall valve size.

Another patent, Boyer et al. No. 3,283,963 issued Nov. 8, 1966 and assigned to the assignee of the present application, discloses a pressurized container valve which solved some of the problems of a multiple part valve. The Boyer et al. valve is a relatively simple, two piece, pressurized container valve which is relatively inexpensive to manufacture and easy to assemble. In the Boyer et al. valve, a resilient valve body member and a valve insert member comprise the valve assembly.

However, if the Boyer et al. valve assembly were to be used as a filling valve, the resilient valve body member would have a tendency to balloon under the high charging pressures used to fill the containers due to the similar resiliency of the entire valve body. This ballooning of the valve body is undesirable since the valve insert member may become disoriented with respect to the valve body and the valve may fail to seat properly, thereby allowing the dispensing fluid to escape and again the pressurized container would be unuseable without at least replacing the valve assembly.

SUMMARY OF INVENTION

The invention of the present case solves the problems of the prior art valves and further provides a valve assembly which is more economical to manufacture, easier to assemble, may be used as either a filling or dispensing valve, and is superior in performance to, while having smaller physical dimensions, than previously known pressurized container valves.

The valve assemblies of the present invention comprise a resilient valve body having distinct advantages over that of Boyer et al. and other prior art devices. The resilient valve body comprises a generally cylindrical resilient material having a passageway therethrough. The resilient valve body member of the present invention has a wall portion of minimum cross-sectional area located proximate a valve seat located in the body member. The wall portion of minimum cross-sectional area in the body member serves to cause the valve body to be distended at this portion of reduced cross-sectional area upon the application of fluid pressure or a mechanical force to the valve assembly. Thus, opening of the valve occurs because of valve body distension at a predetermined portion of the valve body member. Once open, the flow passageway through the body member is unrestricted, that is, no pressure drop exists beyond the valve seat. The absence of a pressure drop beyond or downstream of the valve seat prevents the tendency of the valve body member to balloon, thus solving a major problem of the prior art.

The valve assembly further comprises a valve insert member which is located within the flow passageway through the valve body and which is resiliently biased to the closed position by the valve body member, but which may be configured in such a manner as to provide a valve assembly having the unrestricted flow passageway therethrough as was described above.

Further, the invention of the present case utilizes the resilient valve body for maintaining the valve insert member in a proper attitude with respect to the valve seat during the time the valve is open such that when the force or pressure is removed, the resilience of the valve body member will return the valve to the closed position and the valve insert member will effectively close the passageway through the valve body. This maintenance of proper valve insert attitude or orientation with respect to the valve body is provided by making the valve insert of larger physical dimensions than the passageway through the valve body member so that valve insert attitude is maintained by resilience of the valve body member.

In accordance with the above-stated summary of invention, it is therefore a primary object of this invention to provide a normally closed flow control valve for pressurized containers that is simple and economical to manufacture and assemble, has a small number of parts, has a relatively large flow rate capacity for the physical size of the valve and which assures proper closing and sealing of the flow passageway therethrough upon removal of the valve opening force or pressure.

Another object of the present invention is to provide a normally closed flow control valve which may be used as either a pressurized container filling or dispensing valve or both.

A further object of this invention is to provide a pressurized container valve which includes means to assure proper closing of the flow passageway upon removal of the actuating force or pressure.

Still another object of the present invention is to provide a resilient body valve which is provided with means to prevent ballooning of the valve body upon the application of a fluid pressure to the valve when used as a charging or filling valve for a pressurized container.

A still further object of this invention is to provide a pressurized container filling or dispensing valve which further includes means to prevent atmospheric and other contamination of material to be dispensed even though such material was not completely discharged from the valve body.

Further objects and advantages provided by the invention of the present case will become immediately obvious by reference to the accompanying drawing wherein:

DESCRIPTION OF THE PREFERRED EMBODIMENTS

Figure 1:
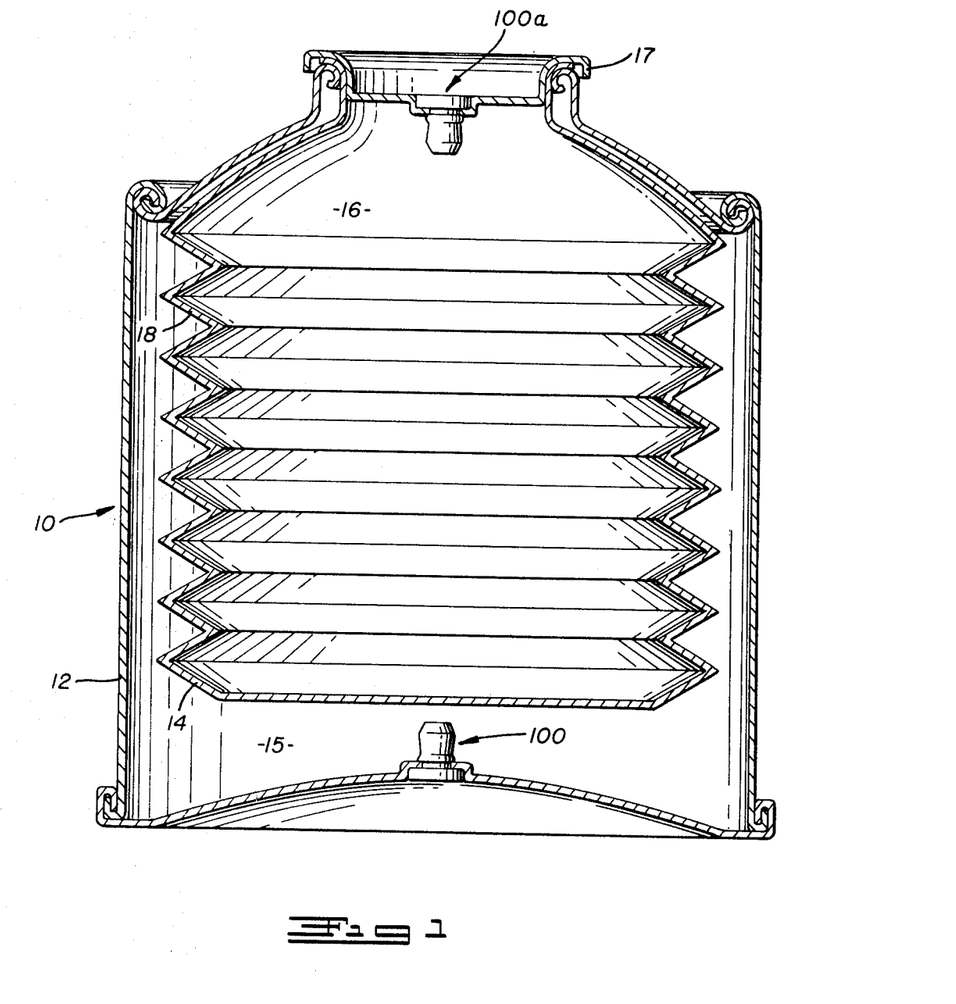
FIG. 1 is a pressurized container of the type to which the invention of the present case is particularly adapted.

In FIG. 1 there is shown a pressurized container 10 of the type to which the invention of the present case is particularly adapted. The pressurized container comprises an outer rigid airtight container 12 and an inner flexible airtight container 14.

The outer rigid container 12 cooperates with the flexible inner container 14 to define a chamber 15 for containing a pressurized fluid such as freon, nitrogen, carbon dioxide or the like. The flexible inner container 14 defines a fluidtight chamber 16 which is adapted to contain a fluid, liquid or other material to be dispensed.

The inner chamber 16 is sealed from the outer chamber 15 by the insertion of a cup member 17 in the outer container 12. The flexible inner container 14 comprises a generally cylindrical body having a series of accordionlike corrugations 18. The corrugations 18 allow the pressurized fluid in the outer chamber 15 to more easily collapse the flexible container 14 and to dispense any material which may be contained in the chamber 16.

In order to fill the outer chamber 15 with fluid there is provided a filling valve 100. The filling valve 100 is located at an appropriate position in the outer container 12.

The inner container 14 and the material containing chamber 16 defined thereby are provided with a similar valve 100a which functions to allow the dispensing of any materials which may be contained in the chamber 16 of the inner container 14. The fluid filling valve 100 and the material dispensing valve 100a form the particular subject matter of this invention and will be more fully described hereinafter by detailed reference to other figures of the drawing.

As shown in FIG. 1, the material dispensing valve 100a is in communication with the inner chamber 16 defined by the inner container 14 through a wall of the outer container 12.

With the inner chamber 16 filled with material to be dispensed and the outer chamber 15 charged with a pressurized fluid dispensing medium, the pressurized container 10 is in operable condition.

Dispensing of the material contained in the chamber 16 is accomplished by actuation or opening of the dispensing valve 100a thereby creating a differential pressure effect between the pressurized dispensing fluid in the chamber 15 and the generally atmospheric fluid condition existing at the exterior of the outer container 12.

Having thus generally described the pressurized container of FIG. 1, reference will now be made to FIG. 2, wherein an enlarged detail view of the fluid filling valve is illustrated in greater detail.

Figure 2:
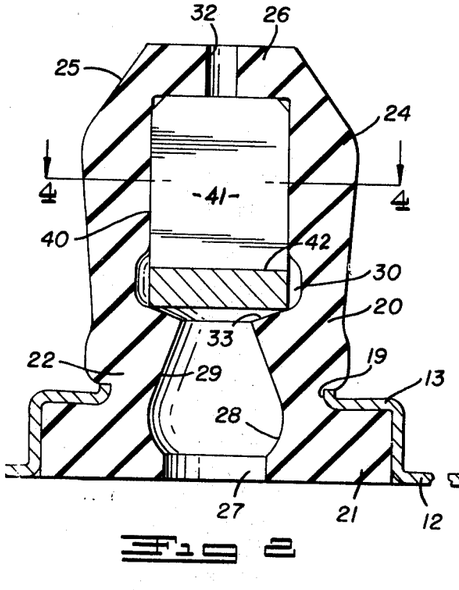
FIG. 2 is a sectional view through an embodiment of the valve assembly of the present invention in the closed position.

In FIG. 2 the pressurized-fluid filling valve is shown in a closed position and comprises a resilient body portion 20. The body portion 20 has a first free configuration as is better illustrated in FIG. 15.

Figure 15:
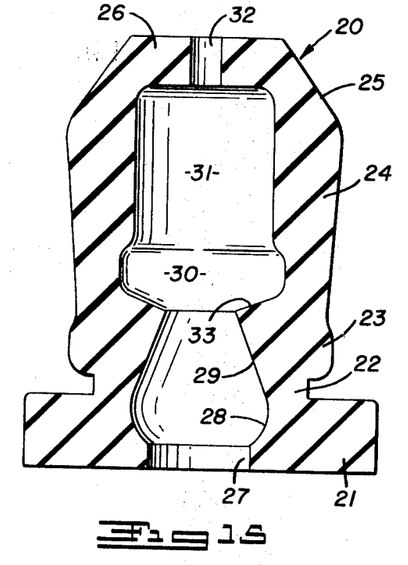
FIG. 15 is a detailed sectional view of the resilient valve body used in several embodiments of the present invention.

In FIG. 15 the resilient body portion 20 of the valves 100 and 100a is shown as a generally cylindrical part molded or made from a resilient material such as rubber.

The body portion 20 of the valve comprises a first generally annular flange portion 21 adapted to be received in a generally annular well 13 in the outer container 12. Adjacent the end portion 21 of the body member 20 is a neck portion 22. Immediately adjacent to the neck portion 22 is a flange 23 extending radially beyond the diameter of the neck portion 22. The end portion 21 of the body member 20 cooperates with the neck portion 22 and the flange 23 to serve as a fluid-tight seal when the body member 20 is inserted through an aperture 19 defined by the outer container 12. The diameter of the aperture 19 is smaller than the free diameter of the body member 20. When the body member 20 is inserted in the aperture 19 therefor, the body member 20 is displaced inwardly and resiliently engages the container 12 at the aperture 19 to provide the aforementioned fluidtight seal because of the interference fit therebetween.

The body member 20 continues as a generally cylindrical portion 24 until intersecting a generally radially extending wall portion 26 defining an end of the body member 20. Along a portion of the body member 20 intermediate the cylindrical portion 24 and the end portion 26 is a generally tapered portion 25 which serves to assist in the insertion of the body member 20 through the aperture 19 in the outer container 12.

The body member 20 is hollow and defines a fluid flow passage therethrough. The fluid flow passage through the body member 20 is configured and may be described generally as follows: the fluid flow passage originates at the end portion 21 of the body member 20 as a generally axially extending aperture 27 and continues after a predetermined distance as a generally bulbous passageway 29. A larger end 28 is provided in the resilient body member 20 and serves in some instances as a second valve seat. The passageway 29 opens into an annular chamber 30 in the resilient body member 20. The fluid passageway through the resilient body member 20 continues as a generally cylindrical portion 31 and terminates as a circular opening 32 in the wall portion 26.

A valve seat surface 33 is formed by one wall of the annular chamber 30.

Returning now to FIGS. 2, 3, and 4 for a more detailed discussion of the embodiment disclosed therein, the resilient body member 20 is inserted into the aperture 19 of the outer container 12.

Figure 3:
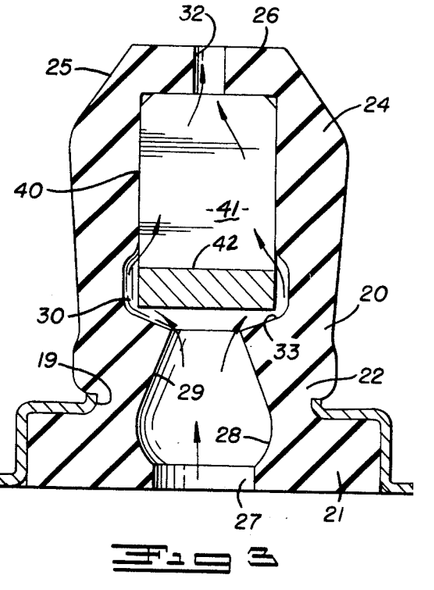
FIG. 3 is a similar view to FIG. 2 showing the valve assembly of FIG. 2 in an open position.

Located within the resilient body member 20 is a rigid, generally cylindrical valve insert member 40. The valve insert member 40 has a length greater than the free length of the chambers 30 and 31 of the resilient body member 20 as shown in FIG. 15. The valve insert member 40 is therefore resiliently biased against a valve seat surface 33 in the resilient body member 20. The valve insert member 40 has a slot 41 therein for allowing fluid flow through the resilient body member 20 when the valve insert member 40 is in the open position shown in FIG. 3. In FIG. 3, the valve insert member 40 has a diameter which is greater than the diameter of the cylindrical chamber 31 of the passageway through the resilient body member 20. The valve insert member 40 is therefore resiliently held in the position shown in FIG. 3 when the valve is in the open position.

Figure 4:
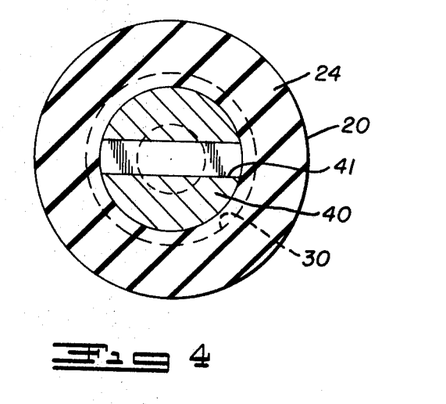
FIG. 4 is a sectional view of FIG. 2 taken along the line 4–4 of FIG. 2.
Figure 5:
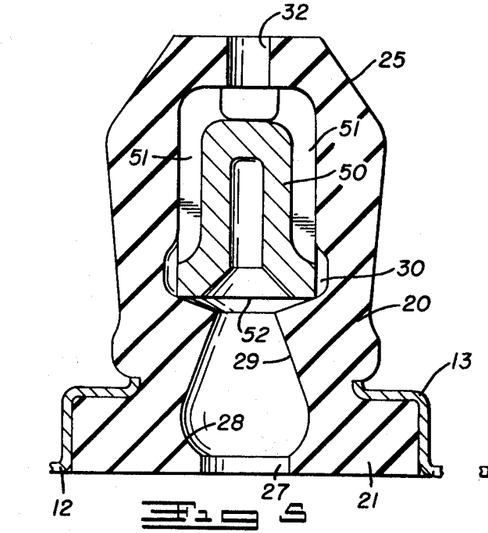
FIG. 5 is a sectional view of another embodiment of the present invention shown in the closed position.
Figure 6:
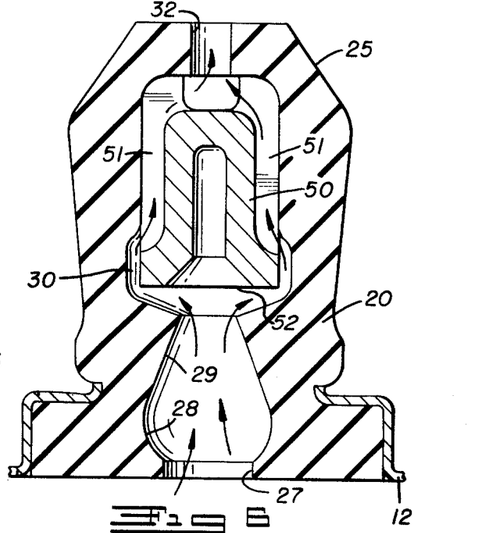
FIG. 6 is similar to FIG. 5 showing the embodiment of FIG. 4 in an open position.

In FIGS. 5 and 6 there is shown a pressurized container filling valve similar to the that shown in FIGS. 2, 3, and 4 wherein the valve insert member 40 of FIGS. 2, 3, and 4 is replaced with a particularly configured valve insert member 50.

Figure 18:
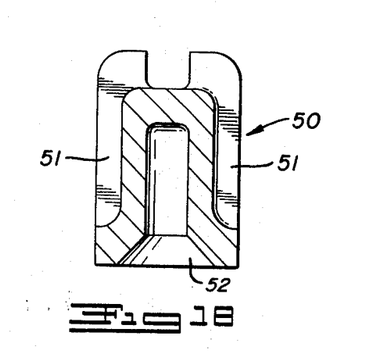
FIG. 18 is a detailed side elevational view of the valve insert member of FIGS. 5 and 6.
Figure 19:
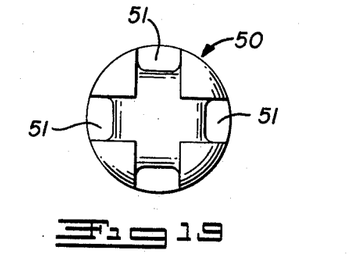
FIG. 19 is another view of the valve insert member of FIGS. 5 and 6.

The particular configuration of the valve insert member 50 is shown in FIGS. 18 and 19 and comprises a pair of radial grooves 51 extending substantially along the side and one end of the valve insert member 50 and a recess 52 at one end thereof.

Figure 7:
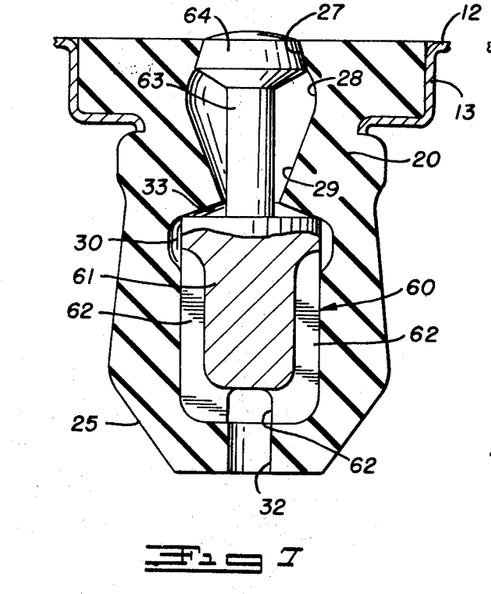
FIG. 7 is a sectional view of still another embodiment of the present invention particularly adapted to be used as a dispensing valve for a pressurized container.
Figure 8:
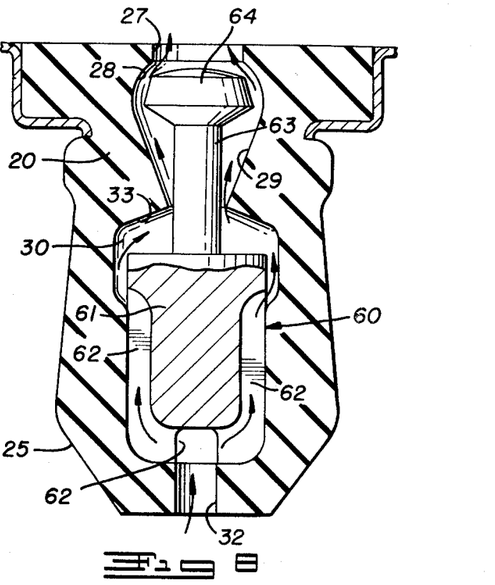
FIG. 8 shows the valve of FIG. 7 in an open position.

In FIGS. 7 and 8 there is shown a dispensing valve assembly utilizing the resilient body member 20 and a valve insert member 60.

Figure 16:
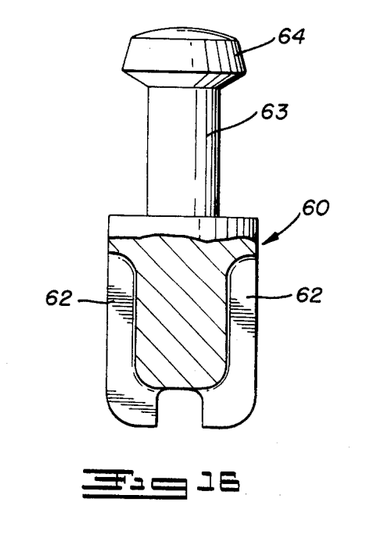
FIG. 16 is a detailed side elevational view of the valve insert member used in the valve assembly of FIGS. 7 and 8.
Figure 17:
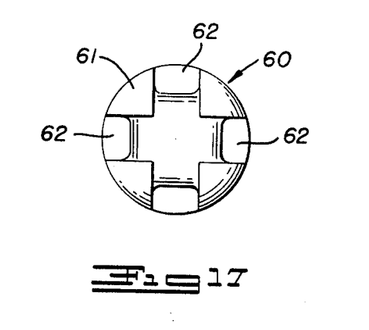
FIGS. 17 is another view of the valve insert member used in the valve assembly of FIGS. 7 and 8.

The valve insert member 60 of FIGS. 7 and 8 is shown in detail in FIGS. 16 and 17 and comprises a body portion 61 which is similar in configuration to the valve insert member 50 of FIGS 18 and 19 having grooves 62 therein and a stem portion 63 having a second valve element 64 thereon.

As shown in FIG. 7, when the valve assembly is in the closed position the body portion 61 of the valve insert member 60 abuts the valve seat surface 33 of the resilient body member 21 thereby creating a fluidtight seal. In addition thereto, the valve element 64 of the stem portion 63 is in sealing abutment with the valve seat 28 located in the end portion 21 of the resilient body member 20. The result is to have a valve element which has two sealing points when the valve is in the closed position.

Figure 8 who shows the valve assembly of FIG. 7 in the open position and illustrates the flow path therethrough.

Figure 9:
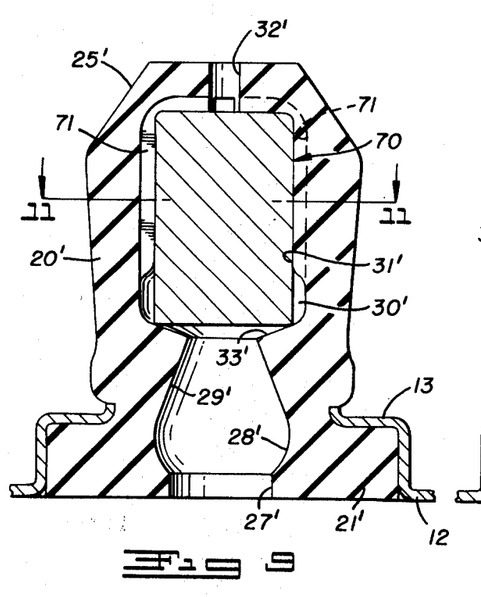
FIG. 9 is a sectional view of still a further embodiment of the present invention.
Figure 10:
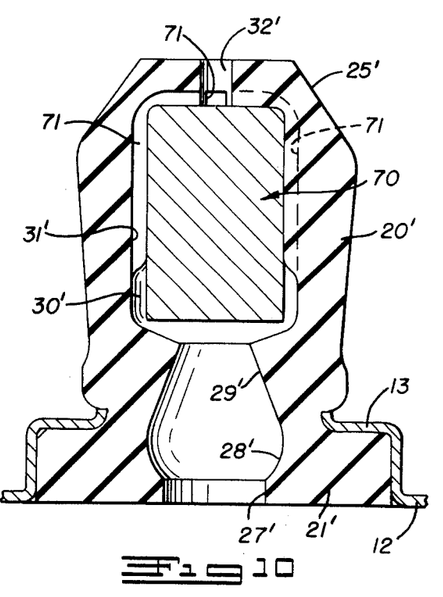
FIG. 10 shows the embodiment of FIG. 9 in an open position.
Figure 11:
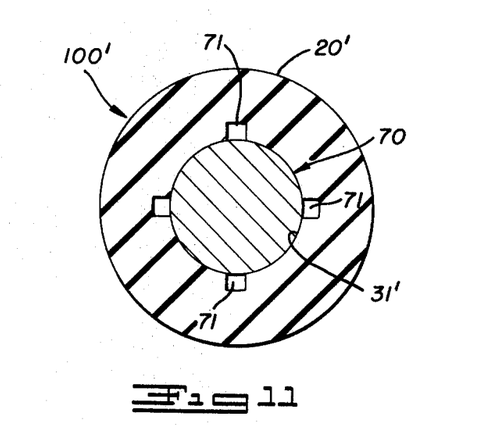
FIG. 11 is a sectional view taken along the line 11-11 of FIG. 10.

In FIGS. 9, 10 and 11 parts indicated by numerals having a prime (') correspond to like parts indicated by like numerals without a prime as previously described with respect to FIGS. 2 through 8 and FIG. 15.

FIGS. 9, 10, and 11 further disclose a valve insert member 70 comprising a generally cylindrical body having no external surface configuration other than that of a smooth cylinder. In the embodiments of FIGS. 9, 10, and 11 the fluid flow passages providing a flow path past the valve insert member 70 are grooves 71 molded into the resilient body member 20'. The use of the generally cylindrical valve insert member 70 allows for the insertion of the valve insert 70 without regard to longitudinal orientation of said insert member 70.

Figure 12:
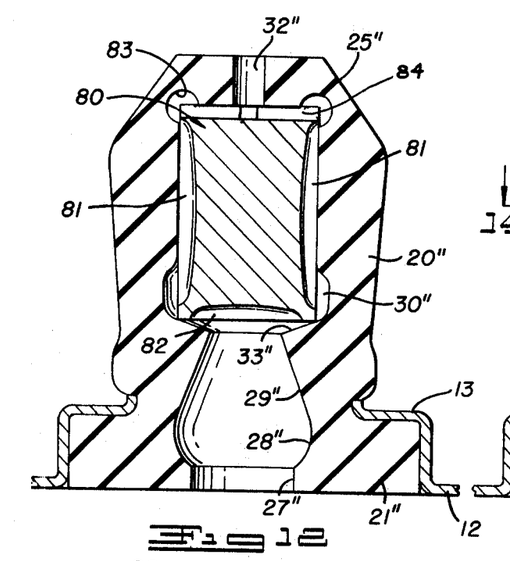
FIG. 12 is a sectional view of another embodiment of the present invention.
Figure 13:
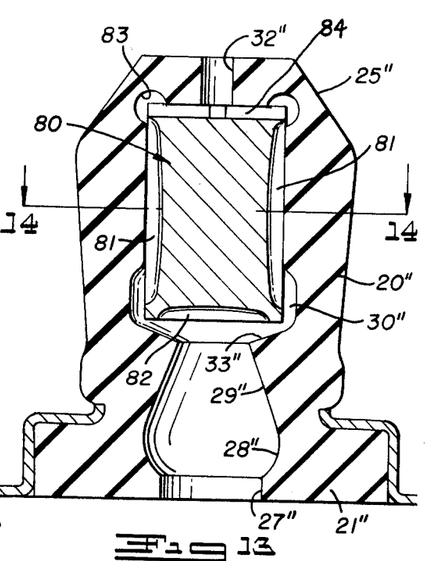
FIG. 13 shows the embodiment of FIG. 12 in an open position.
Figure 14:
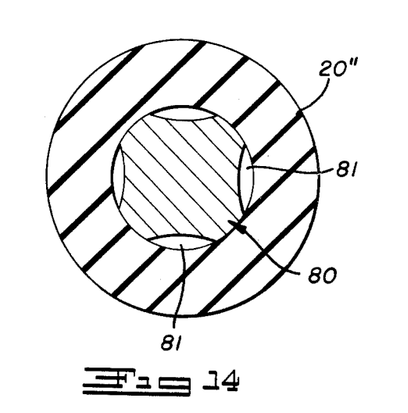
FIG. 14 is a sectional view taken along the line 14-14 of FIG. 13.

In FIGS. 12, 13, and 14 parts indicated by numerals having a double prime (") correspond to like parts indicated by like numerals without the double prime as previously described with respect to FIGS 2 through 8 and FIG. 15.

FIGS. 12, 13, and 14 illustrate still another embodiment of the present invention wherein the valve insert member 80 comprises a generally cylindrical body having a plurality of concave grooves 81 along the longitudinal wall thereof. The valve insert 80 is further provided with a conclave depression or recess 82 for further improving the flow characteristics of the valve. The valve insert member 80 also has a pair of slots 84 in one end thereof for providing for flow therepast when the valve is in the open position. The resilient valve body 20" is also provided with an annular chamber 83 to further improve flow around the valve insert member 80 when the valve is in the open position of FIG. 13.

DESCRIPTION OF OPERATION

Referring now to FIG. 1 for purposes of describing the operation of the valve mechanism of the present invention in an operating environment.

In FIG. 1 there is shown a fluidtight container 12 which is capable of being pressurized with a fluid. Located interiorally of the outer container 12 is a flexible inner container 14 defining a fluidtight chamber 16. Intermediate the outer container 12 and the inner flexible container 14 is defined a chamber 15 for accepting the pressurized fluid.

In operation, the inner flexible container 14 would be filled with a material to be dispensed. With the inner flexible container 14 thus filled with a material to be dispensed, a sealing cap portion 17 would be placed thereon and attached to the outer container 12 in a manner to define the chambers 15 and 16 in a fluidtight manner.

A valve mechanism 100a of the present invention would be placed in the cap portion 17 for purposes of dispensing the material in the chamber 16 as desired. With the material located in the inner flexible container 14 and the chambers 15 and 16 appropriately sealed from each other, a pressurized fluid would be introduced through the valve mechanism 100 and into the chamber 15 defined by the outer container 12 and the inner flexible container 14. The pressurized container 10 would then be in an operative condition. Generally, an appropriate actuating member (not shown) is attached to the outer container in a manner such that the dispensing valve 100a can be actuated when desired and the material contained in the chamber 16 dispensed. The opening of the dispensing valve 100 a, of course, creates a pressure differential between the dispensing fluid contained in the chamber 15 and the atmosphere to which the material in the chamber 16 is to be dispensed and the expanding fluid in the chamber 15 causes the flexible container 14 to collapse to the extent occasioned by opening of the dispensing valve 100a.

In FIG. 2 a valve mechanism of the present invention is shown. The valve mechanism may be used as either a fluid filling valve or a dispensing valve or for both purposes.

The resilient body member 20 of the valve assembly is inserted through an aperture 19 in the outer container 12 and is contained therein in a fluidtight condition. When inserted in the outer container 12, as shown in FIG. 2, the valve assembly assumes the operative condition as illustrated.

The valve insert member 40 is located within the resilient body member 20 before insertion of the body member 20 into the outer container 12 and is specifically contained within the cylindrical chamber 31 of the resilient body member 20 abutting the end portion 26 and extending through the annular chamber 30 into contact with the valve seat surfaces 33 of the resilient body member 20. The valve insert member 40 has a diameter greater than the diameter of chamber 31 and a longitudinal dimension which is greater than the combined axial dimension of the chambers 31 and 30 of the resilient body member 20 when in the relaxed or free state as shown in FIG. 15 of the drawing. Therefore, due to the resiliency of the body member 20, the valve insert 40 is resiliently biased against the valve seat surface 33 of the body member 20 and is further axially located due to the resiliency of the wall portion 24 of the resilient body member 20.

As is shown in FIG. 3, when fluid pressure from a filling mechanism or another force is applied to the valve insert member 40 in a manner to lift the valve insert member 40 from the valve seat surface 33 there is provided through the resilient body member 20 a fluid flow path defined by the opening 27, the bulbous portion 29, the annular chamber 30, the slot 41 in the valve member 40, and the opening 32 in the resilient body member 20.

It is to be noted that located radially exteriorally of the annulus 30 is an area of the resilient body member 20 having the least cross-sectional area. This area of minimum cross section creates a most resilient portion of the resilient body member 20 which is most easily flexed on the application of a pressure or a force to the valve insert member 40. Thus, when a force of a pressure is applied through the valve insert member 40 the valve insert member 40 is lifted by the pressure or force from the valve seat surface 33 in a substantially axial direction. Once the valve insert member 40 is lifted from the valve seat 33 a fluid flow path exists through resilient body member 20. In this regard it is to be noted that the bottom wall 42 of the slot 41 in the valve insert member 40 is located within the annular chamber 30 of the resilient body member 20 when the valve is in the closed position of FIG. 2. It is further important to note that in FIG. 3 when the valve insert member 40 has been moved to the open position to establish a fluid flow path through the resilient body member 20, that substantially all stretching that occurs in the resilient body member 20 occurs at the area of minimum cross-sectional area in a manner such that the bottom wall 42 of the groove 41 in the valve insert member 40 remains in the annular chamber 30 of the resilient body member 20, so that there is no obstruction to fluid flow, once the valve insert member 40 has been lifted from the valve seat 33.

It is of further importance to note that the area of the fluid flow path defined by the groove 41 in the valve insert member 40 and the aperture 32 in the resilient body member 20 are sufficiently large as to not impede the flow of fluid regardless of the extent of opening of the valve insert member with respect to the valve seat surface 33. This feature is important in that the absence of a pressure drop at any point beyond the valve seat surface 33 will avoid the tendency of the resilient body member 20 to balloon. In resilient body valves where a pressure drop exists downstream of the valve seat there would be a tendency, due to the pressure build-up caused by the pressure drop, for the side walls of the resilient body member 20 to inflate in a manner similar to that of a balloon. The presence of this ballooning effect would permit the valve insert member 40 to become misaligned or disoriented in such a manner that upon removal of the applied pressure, the resilient force of the resilient body member 20 would result in the resilient body member 20 acting upon a misaligned valve insert member 40 and would result in a nonclosing condition of the valve.

Another feature of this invention tending to maintain the valve insert member 40 in a properly oriented position with respect to the resilient valve body 20 is the fact that the overall dimensions of the valve insert member 40 are respectively greater than the diameter of the cylindrical chamber 31 and the combined axial length of chambers 30 and 31 in the resilient valve body member 20 when said resilient valve body 20 is in a relaxed or free position as is shown in FIG. 15.

Figure 20:
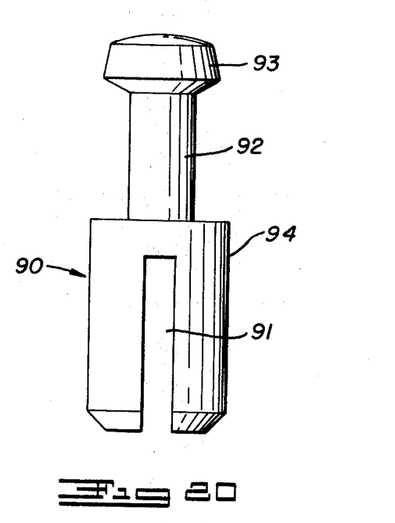
FIG 20 is a side elevational view of a valve insert member which could be used in the resilient valve body of FIG. 15.

In FIG. 20 there is illustrated a valve insert member which will allow the valve assembly of FIGS. 2, 3, and 4 to operate as a dispensing valve. The valve insert member 90 comprises a body portion 94 having a slot 91 therein and which is similar to the valve insert member 40 of FIGS. 2, 3, and 4. However, a stem portion 92 is provided integral with the body portion 94 and a further second valve element 93 is provided to cooperate with the valve seat 28 located in the end portion 21 of the resilient body member 20.

In FIGS. 5 and 6 a valve insert member 50 having a particular configuration, as is shown in FIGS. 18 and 19, is used in place of the cylindrical valve insert member 40 having the groove 41 therethrough.

The valve insert member 50 is a generally cylindrical member having a plurality of grooves 51 extending along substantially the entire longitudinal length thereof and also across one end of the valve insert member 50. In FIG. 5, it can be seen that the length of the valve insert member 50 is greater than the combined free length of the chamber 30 and chamber 31 of the resilient body member 20 when in the free position of FIG. 15 so that the valve insert member 50 is resiliently biased into engagement with the valve seat surface 33 of the resilient body member 20. The diameter of the valve insert member 50 is likewise greater than the free diameter of the chamber 31 in the resilient valve body 20 so that the valve insert member 50 is maintained in axial alignment with the resilient body member 20 when the valve is in open position of FIG. 6.

It can also be seen that the groove 51 in the valve insert 50 extends into the annular chamber 30 in the resilient valve body member 20 when the valve is in the closed position.

In FIG. 6 it can be further seen that, as the valve insert member 50 is moved upwardly by the application of a force or fluid pressure thereto, the weakened portion of the resilient body member located radially, exteriorly of the annular chamber 30 distends in such a manner that the groove 51 of the valve insert member 50 remains in communication with the annular chamber 30 of the resilient body member 20.

In FIGS. 7 and 8 there is shown a filling or dispensing valve assembly for pressurized containers utilizing a resilient body member 20 identical to that described in previous figures. The valve of FIGS. 7 and 8 contains a valve insert member 60 shown in detail in FIGS. 16 and 17 in the drawing and which has a body portion 61 similar to the valve insert member 50 of FIGS. 5 and 6. The valve insert member 60, however, further comprises a stem portion 63 integral with the body portion 61 and further having a second valve element 64 located thereon. As is shown in FIG. 7, when the valve insert member 60 is biased to the closed position by the distention of the resilient body member 20, the valve is closed at the valve seat 33 and further is closed at the valve seat 28 located at the end portion 21 of the resilient body member 20 by the second valve element 64.

The stem portion 63 and the second valve element 64 of the insertable valve member 60 serves several functions.

One function served by the stem section 63 and the second valve element 64 was described above and is the provision of a second fluid sealing valve when the valve mechanism is in the closed position of FIG. 7, that is, the second valve element 64 abuts the valve seat 28 and prevents fluid flow through the resilient body member 20.

Another function served by the stem portion 63 and the second valve element 64 is that the valve insert member 60 is readily available for actuation by an actuating member located exteriorally of the valve element for the purpose of mechanically opening the valve allowing flow therethrough. This function is particularly useful when the valve mechanism is used as a dispensing valve in the pressurized container. That is, the valve mechanism would be in communication on the one side with the chamber 16 defined by the inner flexible container 14 and with the atmosphere at the other end. Therefore, when the valve insert member 60 is physically actuated and the valve opened, there exists a flow path from the chamber 16 to the atmosphere. This flow path comprises the opening 32 in the valve body member 20, the grooves 62 in the valve insert 60, the annular chamber 30 in the resilient body member 20, the bulbous passageway 29 and the opening 27 in the resilient body member 20. It is similarly possible to use the valve mechanism of FIGS. 7 and 8 as a filling or charging valve in which case the valve element 60 could be physically or mechanically opened or opened by the pressurized fluid to allow the flow of fluid through the valve mechanism in the direction opposite to that described above. The secondary sealing feature provided by the second valve element 64 and the valve seat 28 is particularly useful in a dispensing valve for the dispensing of edible and other perishable materials, in that materials not completely dispensed through the valve mechanism, that is, trapped in the chamber defined by the bulbous portion 29 of the resilient body member 20 would be sealed from contamination by the second valve element 64 and the valve seat 28. Thus, contamination of the material, to be dispensed, by dirt or oxidation caused by exposure by the atmosphere is prevented.

In FIGS. 9, 10, and 11 there is disclosed a further embodiment of the present invention.

In FIG. 9 the valve insert element 70 is substantially cylindrical in configuration and may be used without regard to the longitudinal orientation of the valve insert member 70. That is, the valve element 70 may be inserted with either end located towards the opening 32' in the resilient body member 20'. This, of course, simplifies the matter of assembly of the valve mechanism. The valve element 70 has no particular surface configuration except that of a generally smooth cylinder and the fluid flow passages through the resilient body member 20' are provided as grooves 71 molded or formed therein and extending substantially from the annular chamber 30' and are in communication with the aperture 32' in the resilient body member 20'. Again, the diametral dimension of the valve insert member 70 is greater than the diameter of the chamber 31' in the resilient body member 20' when the resilient body member 20' is in a relaxed position as shown in FIG. 15. This assures that the valve insert member 70 will remain properly oriented with respect to the valve body member 20' when the valve mechanism is in open condition as is shown in FIG. 10. The longitudinal dimension of the valve insert member 70 is also greater than the combined free or relaxed longitudinal dimension of the chambers 30' and 31' of the resilient body member 20' so that the valve insert member 70 is normally held against the valve seat surface 33' when the valve mechanism is in its ordinary assembled condition as is shown in FIG. 9.

In FIGS. 12, 13, and 14 there is disclosed a still further embodiment of the present invention again having a valve insert member 80. The valve insert member 80 is substantially cylindrical in configuration having a series of concave grooves 81 on the longitudinal surfaces thereof. Further provided is a generally concave groove or recess 82 on one end portion of the cylindrical valve insert member 80. The other end of the valve insert member 80 is provided with slots 84 to improve the flow from the concave grooves 81 to the opening 32" in the valve body 20". The dimensions of the valve insert member 80 are substantially as described above and the operation of the valve mechanism in FIGS. 12, 13, and 14 is also similar to that described above in the general description of operation. Using the valve insert member 80, however, it is helpful to provide the resilient valve body 20" with an annular chamber 83 to improve flow path around the valve insert member 80 when the valve is in the open position of FIG. 13.

We claim:

1. A fluid flow control valve comprising:
    a unitary resilient flexible valve body member having an inlet, an outlet, and a chamber therebetween and defining a flow path therethrough and having a valve seat intermediate the inlet and the outlet;
    a valve member located within the chamber of the body member and supported thereby for axial movement between a first closed position abutting said valve seat and a second open position with said valve member being radially embraced throughout a major portion of its peripheral surface by a portion of said body member to effectively resist canting of said valve member with respect to said body member;
    said valve member having a groove means in an exterior surface thereof;
    one end of said groove means being in communication with said outlet and the other end of said groove means being adjacent said valve seat to define the portion of said flow path which extends therebetween; and
    said groove means having a cross-sectional area greater than the cross-sectional area of the portion of said flow path across said valve seat in all operative positions of said valve member.

2. The fluid flow control valve of claim 1 wherein said valve body further embraces one end of said valve member and the other end of said valve member is free of any support by said body member when said valve member is in the open position.

3. The fluid flow control valve of claim 2 wherein said body member defines a weakened portion adjacent an end of the valve member to permit a controlled distention of the body member when the valve member moves from the closed to the open position.

4. A flow control valve assembly comprising:
    a resilient hollow valve body having an inlet and an outlet defining a passageway therethrough and having a valve seat in said passageway located intermediate said inlet and said outlet;
    a generally cylindrical valve member located within the body member, said valve member being held in a first normally closed position abutting said valve seat by the resilience of the body member, the valve member being resiliently supported by the valve body throughout a major portion of its peripheral surface for substantially axial movement therewith to a second open position where all of the support provided by said valve body is between the valve seat and the outlet of said body member; and
    a groove in said body member, one end of said groove communicating with said outlet and the other end of said groove being adjacent said valve seat, the valve member defining with the groove in the valve body a flow passageway through the valve body when the valve member is in the open position, said flow passageway being at least as large as the flow path defined by said valve seat and the valve member when the valve member is in a fully open position.

5. A flow control valve assembly comprising:
    a generally cylindrical resilient valve body having a passageway therethrough, a valve seat in said passageway, an annular chamber adjacent said valve seat and a generally cylindrical chamber adjacent said annular chamber; with said annular chamber having a diameter larger than the diameter of the cylindrical chamber to form a most resilient portion of reduced cross section in the valve body; and
    a generally cylindrical valve member located partially within said cylindrical chamber, the valve member having a diameter larger than the relaxed diameter of said cylindrical chamber and a longitudinal dimension larger than the combined relaxed axial dimensions of the cylindrical chamber and the annular chamber, and the valve member having means for defining, in cooperation with the valve body, a flow path from the valve seat to the outlet of said passageway, the valve member being resiliently biased into sealing engagement with the valve seat by the valve body and movable to an open position upon the application of a force thereto, substantially all distention of the valve body necessary to allow opening of the valve occurring at the most resilient portion of the valve body.

6. The valve assembly of claim 5 wherein the valve member and means for defining a flow path comprise a generally cylindrical valve insert member having a longitudinal slot therethrough, the valve insert member being oriented in the valve body such that the open end of the slot is oppositely disposed from said valve seat and the bottom wall of said slot is located within said annular chamber.

7. The valve assembly of claim 6 wherein the valve insert member defines a slot having a cross-sectional area larger than the cross-sectional area of the flow path across the valve seat when the valve insert member is in the fully open position.

8. The valve assembly of claim 5 wherein the valve member and means for defining a flow path comprise a generally cylindrical valve insert member having a groove extending partially along the wall and one end thereof, the valve insert member being oriented in the valve body such that the grooved end of the valve insert member is oppositely disposed from the valve seat and the groove extends into said annular chamber, but terminates short of the other end of the valve insert member.

9. The valve assembly of claim 8 wherein the valve insert member defines a groove having a cross-sectional area greater than the cross-sectional area of the flow path across the valve seat when the valve insert member is in a fully open position.

10. The valve assembly of claim 5 wherein the valve member and means for defining a flow path comprise:
    the valve body having a second annular chamber located at the end of said cylindrical chamber away from the valve seat; and
    a cylindrical valve insert member having a concave depression in the wall thereof and a recess in an end thereof, said concave depression in the wall terminating in said first and second annular chambers of the valve body and said recess being in communication with said valve seat.

11. The valve assembly of claim 10 wherein the valve insert member and valve body define a flow path having a cross-sectional area greater than the cross section of the flow path across the valve seat when the valve insert member is in a fully open position.

12. The valve assembly of claim 5 wherein the valve member has a recess in an end thereof adjacent the valve seat.

13. A valve assembly comprising:
    a generally cylindrical resilient valve body having a passageway therethrough, a valve seat in said passageway, an annular chamber adjacent said valve seat, a cylindrical chamber adjacent said annular chamber, and a groove coextensive with said cylindrical chamber and in communication with an outlet of said passageway, with said annular chamber having a diameter larger than the diameter of said cylindrical chamber to form a most resilient portion of reduced cross section in the valve body; and a generally cylindrical valve insert member located partially within said cylindrical chamber, the valve insert member having a diameter larger than the relaxed diameter of said cylindrical chamber and a longitudinal dimension larger than the combined axial dimension of said cylindrical chamber and said annular chamber such that the valve insert member is resiliently biased to a closed position in sealing engagement with the valve seat by the valve body, the valve insert member being movable to an open position upon the application of a force thereto, substantially all distention of the valve body necessary to open the valve occurring at the most resilient portion of the valve body.

14. The valve assembly of claim 13 wherein:

said groove has a cross-sectional area greater than the cross-sectional area of the flow path across the valve seat when the valve insert member is in a fully open position.

15. A valve assembly comprising:

a generally cylindrical resilient valve body having a passageway therethrough, a first valve seat located in said passageway proximate one end thereof, a second valve seat located intermediate the first valve seat and the other end of said passageway, an annular chamber adjacent said second valve seat and located between said second valve seat and said other end of said passageway, and a cylindrical chamber adjacent said annular chamber, with said annular chamber having a diameter larger than the diameter of said cylindrical chamber to form a most resilient portion of reduced cross section in the valve body; and a valve insert member located partially within said cylindrical chamber, the valve insert member having a generally cylindrical body portion and a generally cylindrical stem portion, the body portion having a diameter larger than the diameter of said cylindrical chamber and a longitudinal dimension larger than the combined axial dimension of said cylindrical chamber and said annular chamber, the stem portion extending axially from the body portion and including a valve element, and the valve insert member being resiliently biased by the valve body such that the valve element engages the first valve seat and one end of the body portion engages the second valve seat thereby providing a valve having two flow sealing portions, the valve insert member being axially movable to a second position opening the passageway through the valve body with substantially all distention of the valve body occurring at the most resilient portion of the valve body.

16. The valve assembly of claim 15 wherein the valve insert member further comprises said cylindrical body portion having a slot there across, the bottom of said slot being located in the annular chamber of the valve body.

17. The valve assembly of claim 15 wherein the valve insert member further comprises: a generally cylindrical head portion having a groove extending partially along the wall and the end thereof with the groove originating at a point on the wall within the annular chamber of the valve body.